US 12,555,557 B2

(12) United States Patent
Satake et al.

(10) Patent No.: US 12,555,557 B2
(45) Date of Patent: Feb. 17, 2026

(54) ULTRASONIC SENSOR

(71) Applicant: DENSO CORPORATION, Kariya (JP)

(72) Inventors: Masayoshi Satake, Nisshin (JP);
Tetsuya Aoyama, Kariya (JP);
Mitsumasa Miyazaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 314 days.

(21) Appl. No.: 18/485,230

(22) Filed: Oct. 11, 2023

(65) Prior Publication Data
US 2024/0038208 A1    Feb. 1, 2024

Related U.S. Application Data

(63) Continuation of application No. PCT/JP2022/010886, filed on Mar. 11, 2022.

(30) Foreign Application Priority Data

Apr. 13, 2021  (JP) .................... 2021-067712

(51) Int. Cl.
| | |
|---|---|
| *G10K 9/13* | (2006.01) |
| *G01S 7/52* | (2006.01) |
| *G01S 15/931* | (2020.01) |
| *G10K 9/12* | (2006.01) |
| *G10K 11/00* | (2006.01) |
| *G10K 9/18* | (2006.01) |
| *G10K 9/20* | (2006.01) |
| *G10K 9/22* | (2006.01) |

(52) U.S. Cl.
CPC ............ *G10K 9/13* (2013.01); *G01S 7/52004* (2013.01); *G01S 15/931* (2013.01); *G10K 9/12* (2013.01); *G10K 11/002* (2013.01); *G01S 2007/52007* (2013.01); *G01S 2015/938* (2013.01); *G10K 9/18* (2013.01); *G10K 9/20* (2013.01); *G10K 9/22* (2013.01)

(58) Field of Classification Search
CPC .. G10K 9/12; G10K 9/13; G10K 9/18; G10K 9/20; G10K 9/22
See application file for complete search history.

(56) References Cited

U.S. PATENT DOCUMENTS 4,754,440 A * 6/1988 Naruse ................. B06B 1/0666
367/188
2017/0059697 A1  3/2017 Esmail

FOREIGN PATENT DOCUMENTS

| JP | H07-035846 A | 2/1995 |
| JP | 2013-130455 A | 7/2013 |
| JP | 2013-228225 A | 11/2013 |

\* cited by examiner

*Primary Examiner* — Benyam Haile
(74) *Attorney, Agent, or Firm* — Maschoff Brennan

(57) ABSTRACT

An ultrasonic sensor includes a magnetic substance, a diaphragm, and an electromagnetic transducer. The electromagnetic transducer is disposed opposing the magnetic substance across an outer plate of a vehicle. The diaphragm has the shape of a thin film with a film thickness direction along an axial direction parallel to a directional axis. The diaphragm is able to ultrasonically oscillate by being joined to an outer surface of the outer plate at an outer edge in a radial direction crossing the directional axis. With the outer edge of the diaphragm joined to the outer surface of the outer plate, an internal space that expands and contracts along the axial direction in response to ultrasonic oscillation of the diaphragm is formed between the diaphragm and the outer surface of the outer plate.

10 Claims, 3 Drawing Sheets

ULTRASONIC SENSOR

CROSS-REFERENCE TO RELATED APPLICATION

The present application is a continuation application of International Application No. PCT/JP2022/010886, filed on Mar. 11, 2022, which claims priority to Japanese Patent Application No. 2021-067712, filed on Apr. 13, 2021. The contents of these applications are incorporated herein by reference in their entirety.

BACKGROUND

Technical Field

The present disclosure relates to an ultrasonic sensor configured to be mounted to a vehicle by being attached to an outer plate of the vehicle.

Background Art

Various ultrasonic sensors have been proposed that are configured to be retrofitted to a vehicle.

SUMMARY

In the present disclosure, provided is an ultrasonic sensor as the following.

The ultrasonic sensor includes a magnetic substance, a diaphragm, and an electromagnetic transducer. The electromagnetic transducer is disposed opposing the magnetic substance across an outer plate of a vehicle. The diaphragm has the shape of a thin film with a film thickness direction along an axial direction parallel to a directional axis. The diaphragm is able to ultrasonically oscillate by being joined to an outer surface of the outer plate at an outer edge in a radial direction crossing the directional axis. With the outer edge of the diaphragm joined to the outer surface of the outer plate, an internal space that expands and contracts along the axial direction in response to ultrasonic oscillation of the diaphragm is formed between the diaphragm and the outer surface of the outer plate.

DETAILED DESCRIPTION OF THE PREFERRED EMBODIMENTS

Figure 1:
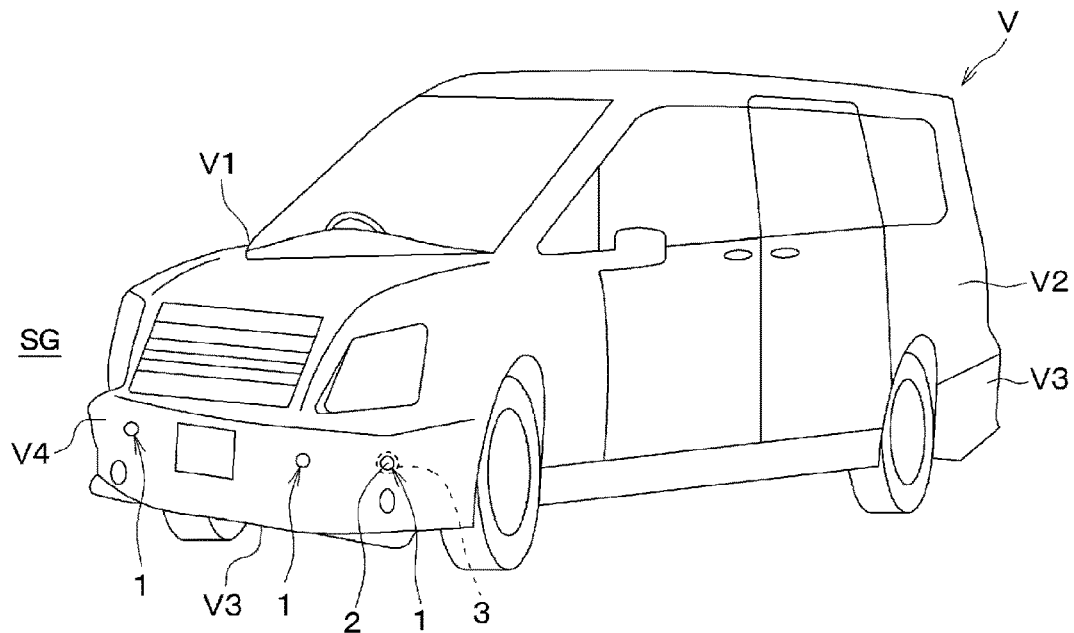
FIG. 1 is a perspective view illustrating appearance of a vehicle equipped with an ultrasonic sensor according to an embodiment.

For example, a vehicular ultrasonic sensor described in PTL 1 is attached to any position in a vehicle by providing a sensor main body in a cover shaped like a bottomed tube and attaching an adhesive portion of a back surface of the cover to any position in the vehicle.

[PTL 1] JP 1995-35846 A

In a mounted state in which the vehicular ultrasonic sensor described in PTL 1 is attached to the vehicle, the cover and the sensor main body protrudes significantly from a body part (for example, a bumper or the like) to which the vehicular ultrasonic sensor is attached, and this is not preferable in terms of design.

The present disclosure has been made in view of the circumstances illustrated above and the like. In other words, the present disclosure provides an ultrasonic sensor that can be retrofitted to a vehicle, the ultrasonic sensor having an improved design.

According to an aspect of the present disclosure, an ultrasonic sensor configured to be mounted to a vehicle by being attached to an outer plate of the vehicle includes:

a magnetic substance, an electromagnetic transducer including a conversion function between an oscillating magnetic field and an electric signal and disposed opposing the magnetic substance across the outer plate, the oscillating magnetic field being between the magnetic substance and the electromagnetic transducer, and a diaphragm having the shape of a thin film with a film thickness direction along an axial direction parallel to a directional axis, the diaphragm being able to ultrasonically oscillate by being joined to an outer surface of the outer plate at an outer edge in a radial direction crossing the directional axis, wherein one of the magnetic substance and the electromagnetic transducer is fixed to the diaphragm in such a manner as to be able to ultrasonically oscillate and to reciprocate along the axial direction, and the other is disposed opposing an inner surface which is a back surface of the outer surface of the outer plate, causing ultrasonic oscillation corresponding to the oscillating magnetic field to be generated in the diaphragm, and with the outer edge of the diaphragm joined to the outer surface of the outer plate, an internal space that expands and contracts along the axial direction in response to ultrasonic oscillation of the diaphragm is formed between the diaphragm and the outer surface of the outer plate.

Note that in each of the sections of the filed documents, some elements are assigned parenthesized reference signs. In this case, each reference sign illustrates merely an example of the correspondence relationship between the element and a specific configuration described in the embodiments described below. Accordingly, the present disclosure is not limited by the description of the reference signs.

EMBODIMENTS

Embodiments of the present disclosure will be described below based on the drawings. Note that for modifications applicable to one embodiment, when any of the modifications is inserted into the series of descriptions related to the embodiment, understanding of the embodiment may be hindered. Accordingly, the modifications will be collectively described after the series of descriptions of the embodiment instead of being inserted into the series of descriptions.

(Vehicle-Mounted Configuration)

With reference to FIG. 1, in the present embodiment, an ultrasonic sensor 1 has a configuration as a vehicle-mounted clearance sonar. Specifically, by being mounted to a vehicle V, the ultrasonic sensor 1 can detect an object present around the vehicle V in an external space SG. The external space SG is a space outside the vehicle V. The vehicle V to which the ultrasonic sensor 1 according to the present embodiment is mounted is hereinafter referred to as the "own vehicle".

The vehicle V is so-called a four-wheeled vehicle, and includes a box-shaped vehicle body V1. A vehicle body panel V2 and a bumper V3 are attached to the vehicle body V1, and are vehicle body parts constituting the outer plate. The bumper V3 is provided at each of a front end and a rear end of the vehicle body V1. The bumper V3 is formed of a synthetic resin that is a material through which a magnetic flux can be transmitted.

The ultrasonic sensor 1 is configured to be mounted to the vehicle V by being attached to the bumper V3. A state in which the ultrasonic sensor 1 is attached to the vehicle V, that is, the bumper V3, is hereinafter referred to as the "vehicle-mounted state". Note that the ultrasonic sensor 1 is normally attached to and removed from the bumper V3 while the bumper V3 is detached from the vehicle body V1. Accordingly, a state in which the ultrasonic sensor 1 is attached to the bumper V3 is referred to as the "attached state". The "vehicle-mounted state" also corresponds to the "attached state".

Specifically, in the vehicle-mounted state, a plurality of (for example, four) ultrasonic sensors 1 is attached to the front bumper, that is, the bumper V3 on the front surface side of the vehicle body V1. The plurality of ultrasonic sensors 1 attached to the front bumper is respectively disposed at different positions in a vehicle width direction. The "vehicle width direction" is a direction orthogonal to a vehicle overall-length direction and a vehicle height direction. The "vehicle height direction" is a direction parallel to a direction in which the gravity acts in a case where the vehicle is stably placed on a horizontal surface in such a manner that the vehicle V can travel. The "vehicle overall-length direction" is a direction defining the overall length of the vehicle V. Similarly, in the vehicle-mounted state, a plurality of (for example, four) ultrasonic sensors 1 is attached to the rear bumper, that is, the bumper V3 on the rear surface side of the vehicle body V1.

In the present disclosure, the bumper V3 is provided with no attachment holes. The "attachment holes" are through-holes used to attach the ultrasonic sensors 1 and each having an inner diameter corresponding to the outside shape of the ultrasonic sensor 1. In other words, the ultrasonic sensor 1 is configured to be "retrofitted" without the need to form attachment holes in bumpers V3 for a non-mounted vehicle (that is, the bumpers V3 with no attachment holes) that is a vehicle V temporarily shipped with no ultrasonic sensors 1 mounted to the vehicle V. The ultrasonic sensor 1 having such a configuration will be described below in detail.

(Ultrasonic Sensor)

Figure 2:
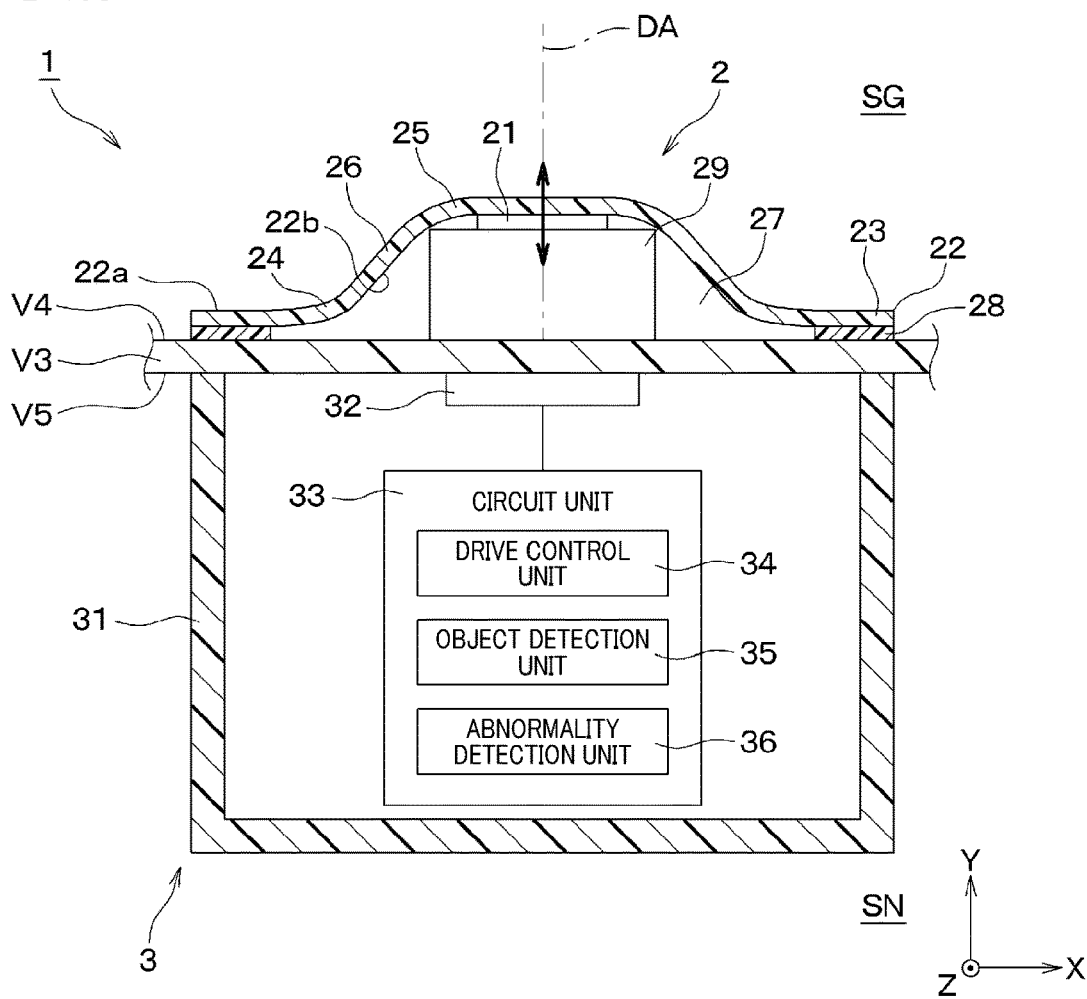
FIG. 2 is an enlarged cross-sectional view of a configuration according to an embodiment of the ultrasonic sensor illustrated in FIG. 1.
Figure 3:
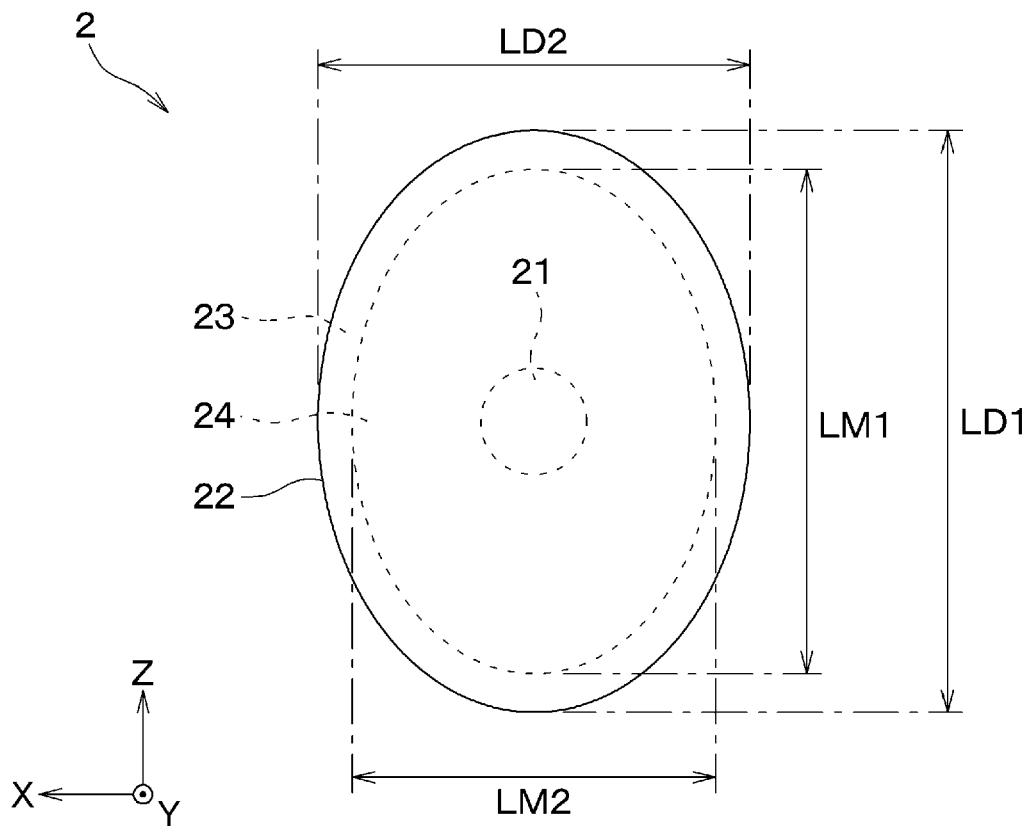
FIG. 3 is a front view of an outer unit illustrated in FIG. 2.

FIG. 2 illustrates one of a plurality of ultrasonic sensors 1 attached to the bumper V3 in the vehicle-mounted state. FIG. 3 illustrates the appearance of an outer unit 2 constituting such an ultrasonic sensor 1. With reference to FIGS. 1 to 3, the configuration of the ultrasonic sensor 1 according to the present embodiment will be described below.

In the present embodiment, the ultrasonic sensor 1 is configured to receive ultrasonic waves. In other words, the ultrasonic sensor 1 has a combined transmission and reception configuration. Specifically, with reference to FIG. 2, the ultrasonic sensor 1 is configured to transmit a probe wave, which is an ultrasonic wave, toward the external space SG along a directional axis DA. The "directional axis" refers to a virtual straight line extending along a transmission and reception direction of ultrasonic waves from the ultrasonic sensor 1, and provides a reference for a directional angle. The "directional axis" is also referred to as a "directional center axis" or a "detection axis". The ultrasonic sensor 1 is configured to receive, from the external space SG, a reception wave including a reflected wave of a probe wave reflected by an object present around the own vehicle and to generate and output an object detection signal corresponding to a reception result for the reception wave.

For convenience of description, as illustrated in FIG. 2, a right-handed XYZ orthogonal coordinate system is set in such a manner that the X axis is parallel to the horizontal direction, that the Y axis is parallel to the directional axis DA, and that the Z axis corresponds to a direction along the vehicle height direction. In this case, the direction parallel to the directional axis DA is referred to as the "axial direction". A "distal end side in the axial direction" is a transmission direction side of the probe wave and corresponds to a positive direction side of the Y axis in FIG. 2. In contrast, a "proximal end side in the axial direction" corresponds to a negative direction side of the Y axis in FIG. 2. Note that the Z axis is not necessarily parallel to the vehicle height direction. Thus, depending on the shape of the bumper V3, the mounted position and mounted orientation of the ultrasonic sensor 1, and the like, the Z axis positive direction may be the same as the vertically upward direction or may cross the vertically upward direction.

Furthermore, any direction orthogonal to the axial direction is referred to as an "in-plane direction". The "in-plane direction" is a direction parallel to the XZ plane in FIG. 2. An "in-plane shape" refers to a shape in the in-plane direction, that is, a shape in a plane parallel to the XZ plane, or a shape projected on the XZ plane. The "in-plane direction" may be optionally referred to as a "radial direction". The "radial direction" is a direction extending orthogonally to and away from the directional axis. In other words, the "radial direction" is a direction in which a half line extends in a case where the half line is drawn in a virtual plane orthogonal to the directional axis DA, using, as a start point, an intersection between the directional axis DA and the virtual plane. In other words, the "radial direction" is the radial direction of a circle in a case where the circle is drawn in a virtual plane using, as the center, an intersection between the virtual space and the directional axis DA.

The bumper V3 includes a bumper outer surface V4 and a bumper inner surface V5. The bumper outer surface V4 is provided to face the external space SG when the bumper V3 is attached to the vehicle body V1. The bumper inner surface V5 is a back surface of the bumper outer surface V4, and is provided to face an interior space SN which is a space inside the own vehicle, that is, the bumper V3, while the bumper V3 is attached to the vehicle body V1.

The ultrasonic sensor 1 includes an outer unit 2 and an inner unit 3. The outer unit 2 is disposed to face the external space SG in the vehicle-mounted state. Specifically, the outer unit 2 is fixed on the bumper outer surface V4. A means for fixing the outer unit 2 to the bumper V3 will be described below. The inner unit 3 is housed in the interior space SN in the vehicle-mounted state. The inner unit 3 is fixed on the bumper inner surface V5 using any fixation means.

In the present embodiment, the outer unit 2 includes a magnetic substance 21 and a diaphragm 22. The magnetic substance 21 is fixed to the diaphragm 22 in such a manner as to be enabled to ultrasonically oscillate and to reciprocate along the axial direction. In other words, the diaphragm 22 is enabled to ultrasonically oscillate while being subjected to deflective deformation by fixedly supporting the magnetic substance 21 that ultrasonically oscillates along the axial direction.

The magnetic substance 21 has the shape of a thin film with a film thickness direction in the axial direction. The diaphragm 22 is formed like a thin film having a film thickness direction in the axial direction. Specifically, the diaphragm 22 is formed into a predetermined shape by shaping and cutting a nonmagnetic synthetic resin film. The outer unit 2 is configured by depositing or coating a magnetic material on the diaphragm 22 made of a synthetic resin film to form a film, providing a thin layer of the magnetic substance 21.

The diaphragm 22 includes an outer surface 22a which is a surface facing the external space SG in the vehicle-mounted state and an inner surface 22b which is a back surface of the outer surface 22a and is a surface opposing the bumper outer surface V4 in the vehicle-mounted state. In the present embodiment, the diaphragm 22 is joined to the magnetic substance 21 on the inner surface 22b.

The diaphragm 22 includes an outer edge 23 which is an outer portion in the radial direction, and a vibrating section 24 located inside the outer edge 23. The outer edge 23 is formed into a flat plate shape having a thickness direction parallel to the axial direction and like a flange shape extending in the radial direction. The outer edge 23 is substantially entirely fixedly joined to the bumper outer surface V4. In other words, the diaphragm 22 is provided in such a manner that with the outer edge 23 substantially entirely joined to the bumper outer surface V4, the vibrating section 24 not jointed to the bumper outer surface V4 can ultrasonically oscillate.

The diaphragm 22 is formed to provide a step along the axial direction, between the outer edge 23 and a center portion 25 to which the magnetic substance 21 is joined. Specifically, the center portion 25 is formed into a flat plate shape having a thickness direction parallel to the axial direction and is disposed closer to a distal end than the outer edge 23 in the axial direction. An intermediate portion 26 between the outer edge 23 and the center portion 25 has a substantially frustum-shaped outer shape. In other words, the diaphragm 22 has a convex shape in which the center portion 25 protrudes from the outer edge 23 toward the distal end in the axial direction, or is formed into a dome shape. With the outer edge 23 of the diaphragm 22 joined to the bumper outer surface V4, an internal space 27 that expands and contracts along the axial direction in response to ultrasonic oscillation of the diaphragm 22 is formed between the vibrating section 24 of the diaphragm 22 and the bumper outer surface V4.

The outer edge 23 of the diaphragm 22 is adapted to be joined to the bumper outer surface V4 via an adhesive layer 28. Specifically, in a pre-attachment state in which the ultrasonic sensor 1 has not been attached to the bumper V3 yet, the adhesive layer 28 is fixedly joined to the outer edge 23 of the diaphragm 22 in advance. In such a pre-attachment state, a release sheet (not illustrated) is stuck to a surface of the adhesive layer 28 opposite to the side joined to the inner surface 22b. The adhesive layer 28 is provided substantially all over the inner surface 22b corresponding to the outer edge 23.

The internal space 27 houses a space holding member 29. The space holding member 29 is disposed in the internal space 27 in such a manner as to be elastically deformable along the axial direction in response to ultrasonic oscillation of the diaphragm 22. In the present embodiment, the space holding member 29 is formed of a nonmagnetic synthetic resin such as a foam sponge which has elasticity.

The magnetic substance 21 has a generally circular in-plane shape around the directional axis DA. On the other hand, as illustrated in FIG. 3, in the present embodiment, the diaphragm 22 has an elliptic in-plane shape having a longitudinal direction in the Z axis direction in such a manner that a first diaphragm dimension LD1 is longer than a second diaphragm dimension LD2. The first diaphragm dimension LD1 is the dimension of the diaphragm 22 in the Z axis direction (that is, a first in-plane direction) orthogonal to the film thickness direction of the diaphragm 22. The second diaphragm dimension LD2 is the dimension of the diaphragm 22 in the X axis direction (that is, a second in-plane direction) orthogonal to the film thickness direction of the diaphragm 22 and the Z axis direction.

The diaphragm 22 is formed in such a manner that a first vibrating unit dimension LM1 is longer than a second vibrating unit dimension LM2. The first vibrating unit dimension LM1 is the dimension of the vibrating section 24 in the Z axis direction (that is, a first in-plane direction) orthogonal to the film thickness direction of the diaphragm 22. The second vibrating unit dimension LM2 is the dimension of the vibrating section 24 in the X axis direction (that is, a second in-plane direction) orthogonal to the film thickness direction of the diaphragm 22 and the Z axis direction. In other words, the in-plane shape of the vibrating section 24 is formed into an ellipse shape that is generally similar to the in-plane shape of the diaphragm 22. Accordingly, the outer edge 23 has an elliptical ring-like in-plane shape having a longitudinal direction in the Z axis direction and a lateral direction in the X axis direction.

Referring back to FIG. 2, the inner unit 3 includes an inner case 31, an electromagnetic transducer 32, and a circuit unit 33. The inner case 31, constituting a housing of the ultrasonic sensor 1, is formed into a box shape using an insulating synthetic resin. The inner case 31 is fixed on the bumper inner surface V5 using any fixation means such as a double-faced tape in such a manner as to cover the electromagnetic transducer 32 and the circuit unit 33.

The electromagnetic transducer 32 is disposed opposing the bumper inner surface V5. In other words, in the ultrasonic sensor 1, the magnetic substance 21 and the electromagnetic transducer 32 are disposed opposing each other across the bumper V3 in such a manner that the diaphragm 22 is configured to generate ultrasonic oscillation corresponding to the oscillating magnetic field between the magnetic substance 21 and the electromagnetic transducer 32. Specifically, the electromagnetic transducer 32 is disposed in proximity to or in contact with the bumper inner surface V5 or joined with bumper inner surface V5, in the vehicle-mounted state.

The electromagnetic transducer 32 includes a conversion function between the oscillating magnetic field corresponding to the ultrasonic oscillation of the magnetic substance 21 and an electric signal. In other words, the electromagnetic transducer 32 is energized during transmission of the probe wave to generate an oscillating magnetic field to ultrasonically oscillate the magnetic substance 21 and the diaphragm 22. The electromagnetic transducer 32 is adapted to generate, during reception, a reception signal being an electric signal corresponding to the oscillating magnetic field generated by ultrasonic oscillation of the magnetic substance 21 and the diaphragm 22. In the present embodiment, the electromagnetic transducer 32 is configured using an inductor such as a coil.

The circuit unit 33 is electrically connected to the electromagnetic transducer 32. The circuit unit 33 is configured to output, during transmission, drive power to the electromagnetic transducer 32 and receive, during reception, a reception signal from the electromagnetic transducer 32 to detect an object. Specifically, the circuit unit 33 includes a drive control unit 34, an object detection unit 35, and an abnormality detection unit 36.

The drive control unit 34 is provided to control a power application state in which power is applied to the electromagnetic transducer 32. Specifically, the drive control unit 34 is adapted to apply, during transmission, transmission drive power to the electromagnetic transducer 32. The drive control unit 34 is adapted to apply, to the electromagnetic transducer 32, damping power which causes the magnetic substance 21 and the electromagnetic transducer 32 to attract each other, for a predetermined time (that is, a damping time T described below) from stop of application of the drive power. The drive control unit 34 is adapted to reduce the damping power as the time elapses when the application of the damping power is stopped. Furthermore, the drive control unit 34 is adapted to apply, to the electromagnetic transducer 32 in a diagnosis mode, diagnosis power for detecting an abnormality in the outer unit 2, that is, the diaphragm 22.

The object detection unit 35 is provided to execute various types of signal processing such as filter processing on the reception signal received from the electromagnetic transducer 32 to detect an object around the own vehicle. The abnormality detection unit 36 is provided to detect an abnormality in the diaphragm 22 based on a current flowing through the electromagnetic transducer 32 in a case where, in the diagnosis mode, the diagnosis power is applied to the electromagnetic transducer 32.

Effects

With reference to the drawings, an outline will be given of a process of attaching the ultrasonic sensor 1 to the bumper V3 and operation of the ultrasonic sensor 1, according to the present embodiment, together with effects produced by this configuration.

In the present embodiment, the outer unit 2, which is a component of the ultrasonic sensor 1 disposed on the external space SG side, includes a joining body of the magnetic substance 21 and the diaphragm 22, and the space holding member 29. The above-described joining body is joined to the bumper outer surface V4 by the adhesive layer 28 to attach the outer unit 2 to the bumper V3.

Specifically, for example, in a case where the adhesive layer 28 is an adhesive layer used in a double-faced tape or the like, the outer unit 2, from which the release sheet (not illustrated) has been released, is brought into contact with bumper outer surface V4, facilitating attachment of the outer unit 2 to the bumper V3. Removal of the outer unit 2 from the bumper V3 is also facilitated.

On the other hand, the inner unit 3 is fixed on the bumper inner surface V5 using any fixation means. Thus, the ultrasonic sensor 1 is attached to the bumper V3, the ultrasonic sensor 1 being configured in such a manner that the outer unit 2 and the inner unit 3 oppose each other across the bumper V3.

In such attachment of the outer unit 2 and the inner unit 3, no attachment holes need be provided in the bumper V3. Accordingly, the ultrasonic sensor 1 according to the present embodiment can be easily retrofitted to the vehicle V. The process of attaching the ultrasonic sensor 1 to the bumper V3 is simplified whenever possible.

During transmission when the probe wave is transmitted, the drive control unit 34 applies transmission drive power to the electromagnetic transducer 32. Thus, an alternating current of a predetermined frequency flows through the electromagnetic transducer 32. Then, an oscillating magnetic field of the predetermined frequency is generated in the electromagnetic transducer 32.

Here, the bumper V3 is interposed between the magnetic substance 21 and the electromagnetic transducer 32. However, the bumper V3 is formed of the synthetic resin material, which does not hinder the electromagnetic interaction between the magnetic substance 21 and the electromagnetic transducer 32. Thus, the electromagnetic interaction between the magnetic substance 21 and the electromagnetic transducer 32 is possible even when the bumper V3 is interposed between the magnetic substance 21 and the electromagnetic transducer 32. Accordingly, the oscillating magnetic field generated in the electromagnetic transducer 32 acts on the magnetic substance 21 disposed opposing the electromagnetic transducer 32 across the bumper V3. Then, such action of the oscillating magnetic field causes the magnetic substance 21 to ultrasonically oscillate along the axial direction. Thus, the diaphragm 22 oscillates in an ultrasonic band while being subjected to deflection deformation, and the probe wave is transmitted from the diaphragm 22 toward the external space SG along the directional axis DA.

During reception when the reception wave is received, the reception wave propagating from the external space SG to the diaphragm 22 excites the diaphragm 22, which oscillates at a frequency in the ultrasonic band while being subjected to deflection deformation. Then, the magnetic substance 21 ultrasonically oscillates along the axial direction. Thus, an oscillating magnetic field is generated along the directional axis DA.

Here, as described above, electromagnetic interaction between the magnetic substance 21 and the electromagnetic transducer 32 is possible even when the bumper V3 is interposed between the magnetic substance 21 and the electromagnetic transducer 32. Accordingly, the oscillating magnetic field generated by the ultrasonic oscillation of the magnetic substance 21 along the axial direction acts on the electromagnetic transducer 32 disposed opposing the magnetic substance 21 across the bumper V3. Then, such action of the oscillating magnetic field causes an inductive current to flow through the electromagnetic transducer 32. In other words, a reception signal which is an electric signal is generated in the electromagnetic transducer 32. By processing such a reception signal, the object detection unit 35 can detect an object corresponding to a reflected wave contained in the reception wave.

As described above, the above-described configuration enables transmission and reception operations to be favorably implemented even when the bumper V3 is interposed between the magnetic substance 21 and the electromagnetic transducer 32. Consequently, according to the present embodiment, favorable transmission and reception performance can be achieved in the ultrasonic sensor 1 having a configuration that can be attached to the bumper V3 without the need to provide attachment holes in the bumper V3.

In the present embodiment, the outer unit 2 is configured in such a manner that the space holding member 29 is covered by the joining body of the thin-film-like magnetic substance 21 and the film-like diaphragm 22 holding the magnetic substance 21. The space holding member 29 may be made as thin as possible to the extent that the internal space 27 is formed in such a manner as to sufficiently provide transmission sound pressure and reception sensitivity. Accordingly, in such a configuration, the amount of protrusion of the outer unit 2 from the bumper outer surface V4 may be made as small as possible. Therefore, compared to the related art, such a configuration enables favorable improvement of the design aspect of the ultrasonic sensor 1 that can be retrofitted to the vehicle V According to the present embodiment, in the vibrating section 24 which is a portion of the diaphragm 22 that can ultrasonically oscillate, the first vibrating unit dimension LM1 along the vertical direction is longer than the second vibrating unit dimension LM2 along the horizontal direction, as illustrated in FIG. 3. Thus, the directional angle in the YZ plane in the figure can be made smaller than the directional angle in the XY plane in the figure. Consequently, misdetection can be favorably suppressed that is caused by road reflection. The directional angle in the horizontal direction can also be increased using a simplified apparatus configuration. Furthermore, by forming the diaphragm 22 in such a manner as to make the first diaphragm dimension LD1 along the vertical direction longer than the second diaphragm dimension LD2 along the horizontal direction, the directionality as described above can be achieved using simplified manufacturing man-hours and attachment man-hours.

Figure 4:
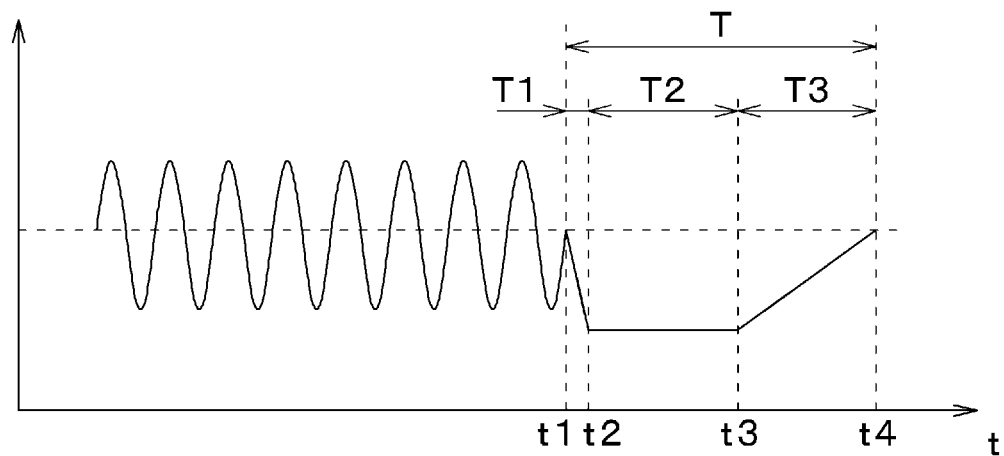
FIG. 4 is a time chart illustrating an outline of control for application of damping control power performed by a drive control unit illustrated in FIG. 2.

When transmission is stopped, that is, application of the drive power is stopped, the drive control unit 34 applies, to the electromagnetic transducer 32 for a predetermined time, damping power that causes the magnetic substance 21 and the electromagnetic transducer 32 to attract each other. FIG. 4 illustrates a manner of applying such damping power. In the figure, the horizontal axis t denotes time, and the vertical axis denotes a current or voltage applied to the electromagnetic transducer 32. At time t1, application of drive power ends. Then, during a damping time T between time t1 and time t4, the damping power is applied to the electromagnetic transducer 32.

Specifically, first, the damping power is raised during a first damping time T1 between time t1 and time t2. Subsequently, the damping power is held constant during a second damping time T2 between time t2 and time t3. Thus, oscillation of the diaphragm 22 is quickly dampened. Then, during a third damping time T3 between time t3 and time t4, the damping power is reduced over time. Thus, unwanted oscillation is suppressed whenever possible. Consequently, reverberation is excellently suppressed when transmission is stopped, thus achieving favorable short-distance detection performance.

In the diagnosis mode, the drive control unit 34 applies the diagnosis power to the electromagnetic transducer 32. The abnormality detection unit 36 detects abnormalities in the diaphragm 22 based on a current flowing through the electromagnetic transducer 32 in the diagnosis mode.

Figure 5:
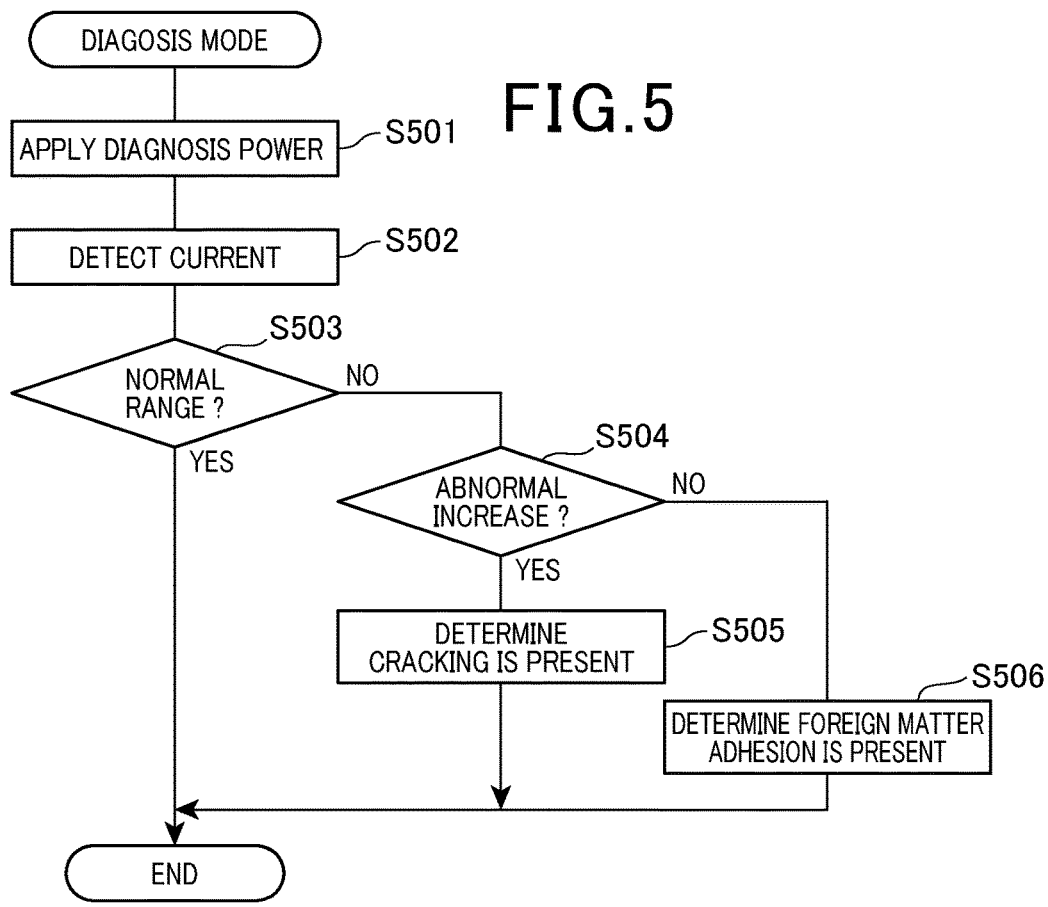
FIG. 5 is a flowchart illustrating an outline of a diagnosis operation performed by a circuit unit illustrated in FIG. 2.

FIG. 5 is a flowchart providing an outline of operation of the circuit unit 33 in the diagnosis mode. In FIG. 5, "S" is an abbreviation of "step". A processor (not illustrated) provided in the circuit unit 33 starts executing the diagnosis mode at a predetermined timing.

When the diagnosis mode is started, first, in step S501, the drive control unit 34 applies the diagnosis power to the electromagnetic transducer 32. Then, in step S502, by application of the diagnosis power, the abnormality detection unit 36 detects a diagnostic current which is a current flowing through the electromagnetic transducer 32.

When the diaphragm 22 is cracked or foreign matter adheres to the diaphragm 22, stress changes to increase or reduce magnetic resistance. Specifically, for example, occurrence of cracking reduces the magnetic resistance, thus increasing the current flowing through the electromagnetic transducer 32. In contrast, adhesion of foreign matter increases magnetic resistance, thus reducing the current flowing through the electromagnetic transducer 32.

Accordingly, in step S503, the abnormality detection unit 36 determines whether the detected diagnosis current is within a normal range. In a case where the diagnosis current is within the normal range (that is, step S503=YES), the abnormality detection unit 36 determines a normal state in which neither cracking nor foreign matter adhesion is occurring in the diaphragm 22, and skips all of the processing in step S504 and subsequent steps. Thus, the diagnosis mode temporarily ends.

In contrast, in a case where the diagnosis current is outside the normal range (that is, step S503=NO), the abnormality detection unit 36 determines whether the detected diagnosis current has an abnormal value on an increase side with respect to the normal range. In a case where the detected diagnosis current has the abnormal value on the increase side with respect to the normal range (that is, step S504=YES), the abnormality detection unit 36 determines in step S505 that the diaphragm 22 is cracked. Subsequently, the diagnosis mode temporarily ends. On the other hand, in a case where the detected diagnosis current has an abnormal value on a decrease side with respect to the normal range (that is, step S504=NO), the abnormality detection unit 36 determines in step 506 that the foreign matter adheres to the diaphragm 22. Subsequently, the diagnosis mode temporarily ends. As described above, in the present embodiment, abnormalities in the diaphragm 22 can be simply detected based on the current flowing through the electromagnetic transducer 32 in the diagnosis mode.

Modifications

The present disclosure is not limited to the above-described embodiment. Thus, appropriate modifications can be made to the above-described embodiment. Typical modifications will be described below. The description of the modifications below focuses on differences from the above-described embodiment. The same or equivalent portions between the above-described embodiment and the modifications are denoted by the same reference signs. Consequently, in the description of the modifications below, the description of the embodiment is applied to the components with the same reference signs as those of the embodiment unless there is no technical inconsistency or any particular additional description.

The target to which the ultrasonic sensor 1 is attached is not limited to the bumper V3. Specifically, for example, as long as the vehicle body panel V2 is formed of a material (for example, synthetic resin) not hindering electromagnetic interaction between the magnetic substance 21 and the electromagnetic transducer 32, the ultrasonic sensor 1 may also be attached to the vehicle body panel V2. In other words, the material of the vehicle body part to which the ultrasonic sensor 1 is attached, for example, the vehicle body panel V2 and/or the bumper V3, is not particularly limited as long as the material does not hinder electromagnetic interaction between the magnetic substance 21 and the electromagnetic transducer 32. The "material through which a magnetic flux can be transmitted" may also be referred to as a "material allowing a magnetic flux to pass through" or a "material not shielding a magnetic flux". As such a material, a nonmagnetic material (for example, a nonmetal material such as a synthetic resin) may be used that contains no added components (for example, fillers or the like) made of a magnetic material such as iron.

The ultrasonic sensor 1 is not limited to the combined transmission and reception configuration. In other words, for example, the ultrasonic sensor 1 may have a configuration exclusively capable of transmitting the probe wave. Alternatively, the ultrasonic sensor 1 may include exclusively the function to receive a reflected wave of a probe wave transmitted from another ultrasonic transmitter, the reflected wave being reflected by a surrounding object.

The configuration of each section of the ultrasonic sensor 1 is not limited to the above-described specific example. Specifically, for example, the in-plane shape of the magnetic substance 21 is not limited to a circle but may be a polygon such as a quadrangle, a hexagon, or an octagon, or an ellipse, or an oval.

The magnetic substance 21 may be a magnet shaped like a thin plate. In this case, the magnetic substance 21 and the diaphragm 22 may be joined together using any joining means such as an adhesive.

The in-plane shape of the diaphragm 22 is not limited to an ellipse, but may be a polygon such as a rectangle having a longitudinal direction and a lateral direction that are orthogonal to each other.

Figure 6:
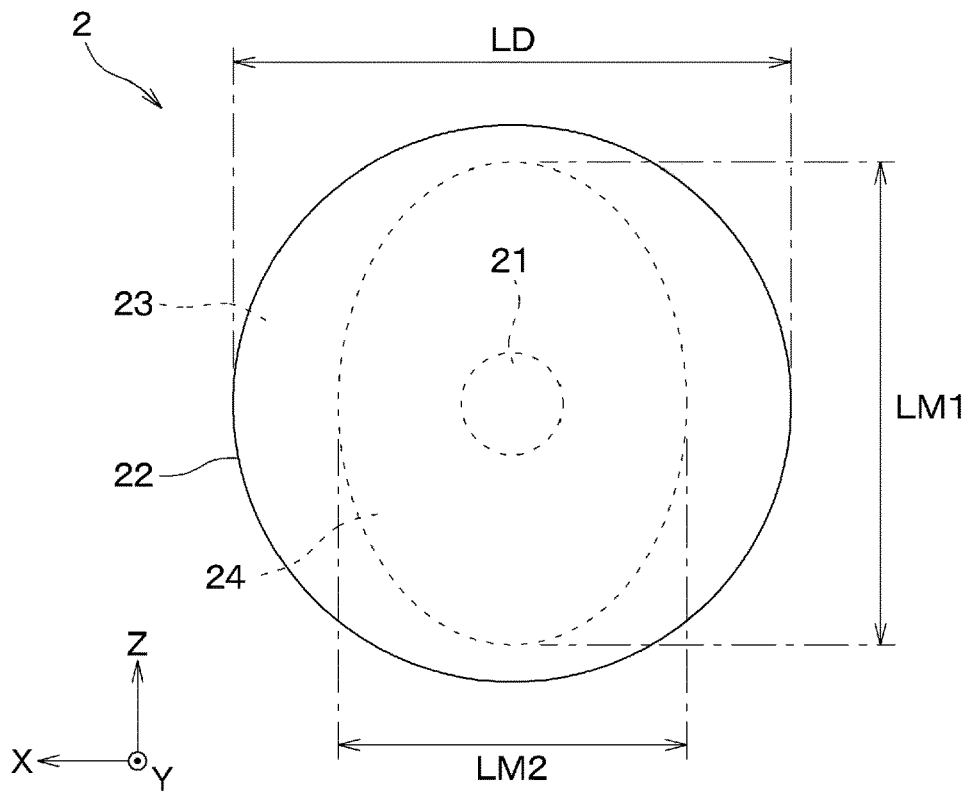
FIG. 6 is a front view illustrating a general configuration of a modification of the outer unit illustrated in FIG. 3.

Instead of an ellipse having a longitudinal direction and a lateral direction that are orthogonal to each other, the in-plane shape of the diaphragm 22 may be a circle or the like that does not have such a longitudinal direction and a lateral direction. For example, as illustrated in FIG. 6, the in-plane shape of the diaphragm 22 is a circle having a certain diaphragm diameter LD. Even in this case, by adjusting the shape of the outer edge 23, that is, the dimension ratio or area ratio between the outer edge 23 and the vibrating section 24 in an in-plane direction, the vibrating section 24 can be formed in such a manner that the first vibrating unit dimension LM1 is longer than the second vibrating unit dimension LM2. Specifically, the ratio of the outer edge 23 in the Z axis direction (that is, the first in-plane direction) is smaller than the ratio of the outer edge 23 in the X axis direction (that is, the second in-plane direction).

The adhesive layer 28 may be omitted. In other words, for example, the outer edge 23 of the diaphragm 22 can be joined directly to the bumper V3 by thermal welding or the like.

The space holding member 29 may be a fluid such as a gel-like substance with which the internal space 27 is substantially entirely filled.

The space holding member 29 may be omitted. In other words, the internal space 27 may be held by the rigidity of the diaphragm 22.

The above-described embodiment is configured such that the magnetic substance 21 is joined to the diaphragm 22, whereas the electromagnetic transducer 32 is provided in the inner unit 3. However, the present disclosure is not limited to such a configuration.

Specifically, in a possible configuration, the electromagnetic transducer 32 is joined to the diaphragm 22, whereas the magnetic substance 21 is provided in the inner unit 3. In this case, a sheet- or film-like inductor is used as the electromagnetic transducer 32.

In such a configuration, the bumper V3 needs to be provided with wiring through-holes through which connection wires are passed, the connection wires being used to electrically connect the electromagnetic transducer 32 disposed on the bumper outer surface V4 side and the circuit unit 33 disposed on the bumper inner surface V5 side. However, such wiring through-holes only need to allow the connection wires to pass through. Accordingly, compared to known attachment holes, such wiring through-holes have very small diameters and are very easily formed and do not require as high position accuracy and shape accuracy as those required for known attachment holes. By attaching the outer unit 2 to the bumper V3, such wiring through-holes are visually hidden by the outer unit 2. Consequently, even such a configuration does not significantly hinder the retrofitting capability. No particular inconvenience results in terms of design.

Of course, the elements constituting the above-described embodiments are not necessarily essential unless the elements are specified to be essential, are in principle considered to be essential, and the like. In a case where a numerical value for any component such as the number, quantity, or range is referred to, the present disclosure is not limited to the particular numerical value unless the numerical value is specified to be essential, the present disclosure is in principle obviously limited to the particular numerical value, and the like. Similarly, in a case where the shape, direction, position relationship, or the like of any component is referred to, the present disclosure is not limited to the shape, direction, position relationship, or the like in a case where the shape, direction, position relationship, or the like is particularly specified to be essential, where the present disclosure is in principle limited to the particular shape, direction, position relationship, or the like, and the like.

The modifications are also not limited to the above-described examples. Specifically, for example, a plurality of modifications may be combined together in a manner other than those illustrated above unless there is technical inconsistency.

What is claimed is:
1. An ultrasonic sensor configured to be mounted to a vehicle by being attached to an outer plate of the vehicle, the ultrasonic sensor comprising:
   a magnetic substance;
   an electromagnetic transducer comprising a conversion function between an oscillating magnetic field and an electric signal and disposed opposing the magnetic substance across the outer plate, the oscillating magnetic field being between the magnetic substance and the electromagnetic transducer; and
   a diaphragm having the shape of a thin film with a film thickness direction along an axial direction parallel to a directional axis, the diaphragm being able to ultrasonically oscillate by being joined to an outer surface of the outer plate at an outer edge in a radial direction crossing the directional axis, wherein
   one of the magnetic substance and the electromagnetic transducer is fixed to the diaphragm in such a manner as to be able to ultrasonically oscillate and to reciprocate along the axial direction, and the other is disposed opposing an inner surface which is a back surface of the outer surface of the outer plate, causing ultrasonic oscillation corresponding to the oscillating magnetic field to be generated in the diaphragm, and
   with the outer edge of the diaphragm joined to the outer surface of the outer plate, an internal space that expands and contracts along the axial direction in response to ultrasonic oscillation of the diaphragm is formed between the diaphragm and the outer surface of the outer plate.

2. The ultrasonic sensor according to claim 1, wherein the outer edge of the diaphragm is joined to the outer surface of the outer plate via an adhesive layer.

3. The ultrasonic sensor according to claim 1, further comprising a space holding member disposed in the internal space in such a manner as to be elastically deformable along the axial direction in response to ultrasonic vibration of the diaphragm.

4. The ultrasonic sensor according to claim 1, wherein the magnetic substance is joined to the diaphragm, and the electromagnetic transducer is disposed opposing the inner surface of the outer plate.

5. The ultrasonic sensor according to claim 4, wherein the magnetic substance has the shape of a thin film.

6. The ultrasonic sensor according to claim 1, wherein the diagram comprises a vibrating section enabled to ultrasonically oscillate on an inner side of the outer edge in the radial direction, and
in a case where a first in-plane direction is defined as a direction orthogonal the film thickness direction, a second in-plane direction is defined as a direction orthogonal the film thickness direction and the first in-plane direction, a first vibrating unit dimension is defined as a dimension of the vibrating section in the first in-plane direction, and a second vibrating unit dimension is defined as a dimension of the vibrating section in the second in-plane direction, the diaphragm is formed in such a manner that the first vibrating unit dimension is longer than the second vibrating unit dimension.

7. The ultrasonic sensor according to claim 6, wherein
in a case where a first diaphragm dimension is defined as a dimension of the diaphragm in the first in-plane direction, and a second diaphragm dimension is defined as a dimension of the diaphragm in the second in-plane direction, the diaphragm is formed in such a manner that the first diaphragm dimension is longer than the second diaphragm dimension.

8. The ultrasonic sensor according to claim 1, further comprising:
a drive control unit controlling a state of power application to the electromagnetic transducer, wherein
the drive control unit is configured to apply, to the electromagnetic transducer, damping power which causes the magnetic substance and the electromagnetic transducer to attract each other, for a predetermined time from stop of application of transmission drive power.

9. The ultrasonic sensor according to claim 8, wherein
the drive control unit is configured to reduce the damping power over time.

10. The ultrasonic sensor according to claim 8, further comprising
an abnormality detection unit configured to detect an abnormality in the diaphragm based on a current flowing though the electromagnetic transducer in a case where the drive control unit applies diagnosis power to the electromagnetic transducer.

* * * * *